US00RE47212E

(19) United States
(12) Reissued Patent
Kim et al.

(10) Patent Number: US RE47,212 E
(45) Date of Reissued Patent: Jan. 22, 2019

(54) METHOD FOR REDUCING POWER CONSUMPTION OF A TERMINAL IN CELLULAR SYSTEM

(71) Applicant: Electronics and Telecommunications Research Institute, Daejon (KR)

(72) Inventors: Jae-Heung Kim, Daejon (KR); Jung-Im Kim, Daejon (KR); Kyoung-Seok Lee, Daejon (KR); Byung-Han Ryu, Daejon (KR); Seung-Chan Bang, Daejon (KR)

(73) Assignee: Electronics and Telecommunications Research Institute, Daejeon-si (KR)

(21) Appl. No.: 14/884,156

(22) Filed: Oct. 15, 2015

Related U.S. Patent Documents

Reissue of:
(64) Patent No.: 8,560,025
Issued: Oct. 15, 2013
Appl. No.: 12/281,913
PCT Filed: Mar. 6, 2007
PCT No.: PCT/KR2007/001094
§ 371 (c)(1),
(2) Date: Jan. 5, 2009
PCT Pub. No.: WO2007/102689
PCT Pub. Date: Sep. 13, 2007

(30) Foreign Application Priority Data

Mar. 7, 2006 (KR) ..... 10-2006-0021316
Mar. 10, 2006 (KR) ..... 10-2006-0022697
Feb. 2, 2007 (KR) ..... 10-2007-0010883

(51) Int. Cl.
*H04B 1/38* (2015.01)

(52) U.S. Cl.
CPC ..... *H04B 1/38* (2013.01)

(58) Field of Classification Search
CPC ..... H04B 1/38; H04W 52/02
(Continued)

(56) References Cited

U.S. PATENT DOCUMENTS 5,239,557 A * 8/1993 Dent ..... H04B 1/70755 370/342
5,430,760 A * 7/1995 Dent ..... H04J 13/004 375/141
(Continued)

FOREIGN PATENT DOCUMENTS

EP 1 414 201 4/2004
KR 10-1999-0066380 A 8/1999
(Continued)

OTHER PUBLICATIONS

International Search Report for PCT/KR2007/001094 dated Jun. 16, 2007.

*Primary Examiner* — Michelle Tarae

(57) ABSTRACT

Provided is a method and apparatus for discontinuously transmitting/receiving packets for low-power consumption of a terminal in a cellular system for packet transmission. The present invention provides a method and apparatus that can perform a low-power consuming operation when a terminal is in active state in a cellular system. The method for discontinuously transmitting/receiving packet data to reduce power consumption of a terminal in a cellular system, including the steps of: a) establishing discontinuous transmission/reception (DTX/DRX) parameters including discontinuous DTX/DRX cycle information for terminals operating in a transmission suspension mode, which is a sub-state of an active state; and b) performing DTX/DRX based on the DTX/DRX parameters in the terminals operating in the transmission suspension mode.

37 Claims, 3 Drawing Sheets

(58) Field of Classification Search
USPC ..... 455/574
See application file for complete search history.

(56) References Cited

U.S. PATENT DOCUMENTS

| | | | | |
|---|---|---|---|---|
| 5,590,396 | A | 12/1996 | Henry | |
| 5,745,860 | A * | 4/1998 | Kallin | H04W 52/0229 455/574 |
| 6,377,803 | B1 * | 4/2002 | Ruohonen | H04W 36/0094 455/343.1 |
| 6,456,604 | B1 | 9/2002 | Lee et al. | |
| 6,463,307 | B1 * | 10/2002 | Larsson et al. | 455/574 |
| 7,190,964 | B2 * | 3/2007 | Damnjanovic | H04W 52/40 370/318 |
| 7,536,167 | B2 * | 5/2009 | Gollnick | G08C 17/02 455/343.4 |
| 7,558,557 | B1 * | 7/2009 | Gollnick | G08C 17/02 455/343.4 |
| 7,873,343 | B2 * | 1/2011 | Gollnick | G06F 1/1626 455/343.3 |
| 8,305,945 | B2 * | 11/2012 | Kim | H04W 52/0216 370/311 |
| 2002/0006805 | A1 * | 1/2002 | New | H04W 48/16 455/525 |
| 2003/0117968 | A1 | 6/2003 | Motegi et al. | |
| 2003/0117969 | A1 | 6/2003 | Koo et al. | |
| 2004/0127206 | A1 * | 7/2004 | Van Bosch et al. | 455/418 |
| 2007/0064662 | A1 * | 3/2007 | Bultan et al. | 370/338 |
| 2008/0293426 | A1 * | 11/2008 | Kim | H04W 52/0216 455/450 |

FOREIGN PATENT DOCUMENTS

| | | |
|---|---|---|
| KR | 1999-0066380 | 8/1999 |
| WO | 99/38278 | 7/1999 |
| WO | 01/03381 | 1/2001 |

* cited by examiner

METHOD FOR REDUCING POWER CONSUMPTION OF A TERMINAL IN CELLULAR SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS REFERENCES TO RELATED APPLICATIONS*

*This application is a reissue application of U.S. Pat. No. 8,560,025 issued Oct. 15, 2013, which is issued from U.S. application Ser. No. 12/281,913 which is a national entry of International Application No. PCT/KR2007/001094, filed Mar. 6, 2007, which claims priorities to and the benefits of Korea Patent Application No. 10-2006-0021316 filed Mar. 7, 2006, Korean Patent Application No. 10-2006-0022697 filed Mar. 10, 2006, and Korean Patent Application No. 10-2007-0010883, filed Feb. 2, 2007 in the Korean Intellectual Property Office, the contents of which are incorporated herein by reference.*

TECHNICAL FIELD

The present invention relates to a low power-consuming operation in a cellular system; and, more particularly, to a low power-consuming operation method of a terminal that can reduce the power consumption of the terminal and extend a call waiting time in a cellular system for packet transmission.

BACKGROUND ART

In a conventional cellular system, terminals have performed a low power-consuming operation, i.e., a power-saving operation, by using a sleep-mode operation based on a discontinuous reception (DRX) cycle, which is a system parameter.

The WCDMA 3GPP system aims to provide circuit and packet services in a circuit-based system. On the other hand, a Long-Term Evolution (LTE), which is under standardization process to provide diverse packet services, is a packet-based system aiming to provide only a packet service.

Therefore, the LTE system which is devised to provide a packet service having a burst characteristic requires an efficient low power-consuming operation method for terminals.

In short, it is required to develop a method that can reduce power consumption not only in idle-state terminals whose session for a packet service is terminated, but also in active-state terminals in a section where there is no data to be transmitted to provide a packet service having a burst characteristic and diverse qualities of service (QoS).

DISCLOSURE

Technical Problem

It is, therefore, an object of the present invention to provide a method that can effectively reduce power consumption of a terminal by using an indicator indicating whether the terminal needs to perform a low power-consuming operation to control the low power-consuming operation in a cellular system for transmitting packets.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a method for performing low power-consuming operation to reduce power consumption of a terminal in a cellular system for a packet service, including the steps of: a) establishing low power-consuming operation parameters including a low power-consuming operation indicator in a terminal operating in a transmission suspension mode, which is a sub-state of an active state; and b) performing the low power-consuming operation based on the low power-consuming operation parameters in the terminal according to a value of the low power-consuming operation indicator.

Advantageous Effects

The method of the present invention can effectively reduce power consumption of a terminal by using an indicator indicating whether the terminal needs to perform a low power-consuming operation to control the low power-consuming operation in a cellular system for transmitting packets, when the terminal is in an active state.

BEST MODE FOR THE INVENTION

Other objects and aspects of the invention will become apparent from the following description of the embodiments with reference to the accompanying drawings, which is set forth hereinafter. Accordingly, those skilled in the art of the present invention can easily implement the technological concept of the present invention. Also, when it is considered that detailed description on a prior art related to the present invention may obscure the points of the present invention unnecessarily in the description of the present invention, the description will not be provided. Hereinafter, specific embodiments of the present invention will be described in detail with reference to the accompanying drawings.

Figure 1:
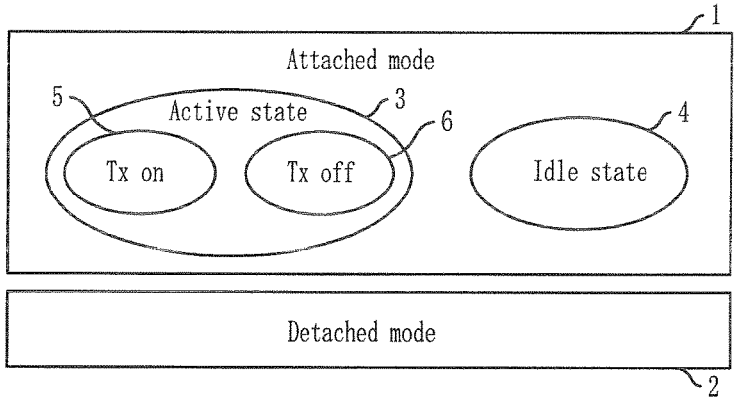
FIG. 1 is a diagram illustrating a terminal state in a cellular system to which the present invention is applied.

FIG. 1 is a diagram illustrating terminal states in a cellular system to which the present invention is applied.

A cellular system providing a packet service defines and manages the state of a terminal as shown in FIG. 1 to efficiently operate limited radio resources in nodes over a base station, i.e., a node B.

When a terminal is registered on a network through a base station, the state of the terminal is defined as an attached mode 1. When a terminal is not recognized on a cellular network and the base station, or when the terminal is not registered, the state of the terminal is defined as a detached mode 2.

Terminals in the attached mode 1 are divided into those of an active state 3 and those of an idle state 4 according to whether or not a packet service is provided.

The active state 3 is a state where a terminal can be allocated with radio resources for transmitting/receiving packet data under the control of a scheduling unit disposed in a base station.

The active state 3 is divided into a transmission mode (Tx on) 5 and a transmission suspension mode (Tx off) 6 according to whether radio resources for transmitting packet data are allocated.

A conventional terminal performs a low power-consuming operation, which is so-called a power-saving operation, by maintaining only the least control channel with a base station only in the idle state 4 where there is no data to be transmitted/received based on the burst property of packet data. The terminal may enter the idle state 4 by a scheduling unit of a base station, regardless of the state of the terminal.

In the transmission suspension mode 6 of the active state 3, the scheduling unit operates in the transmission suspension mode because there are no data to be transmitted or received due to the burst characteristic of packet data or other reasons and does not allocate the radio resources for transmitting/receiving packet data and control information. The terminals need to efficiently perform the low power-consuming operation in a transmission suspension mode duration to minimize the power consumption of the terminal.

According to the embodiment of the present invention, terminals performs low power-consuming operation based on a discontinuous reception (DRX) cycle established between the terminals and the base station in a duration of the transmission suspension mode 6, which is a sub-state of the active state 3, while maintaining the least power for a control channel.

Figure 2:
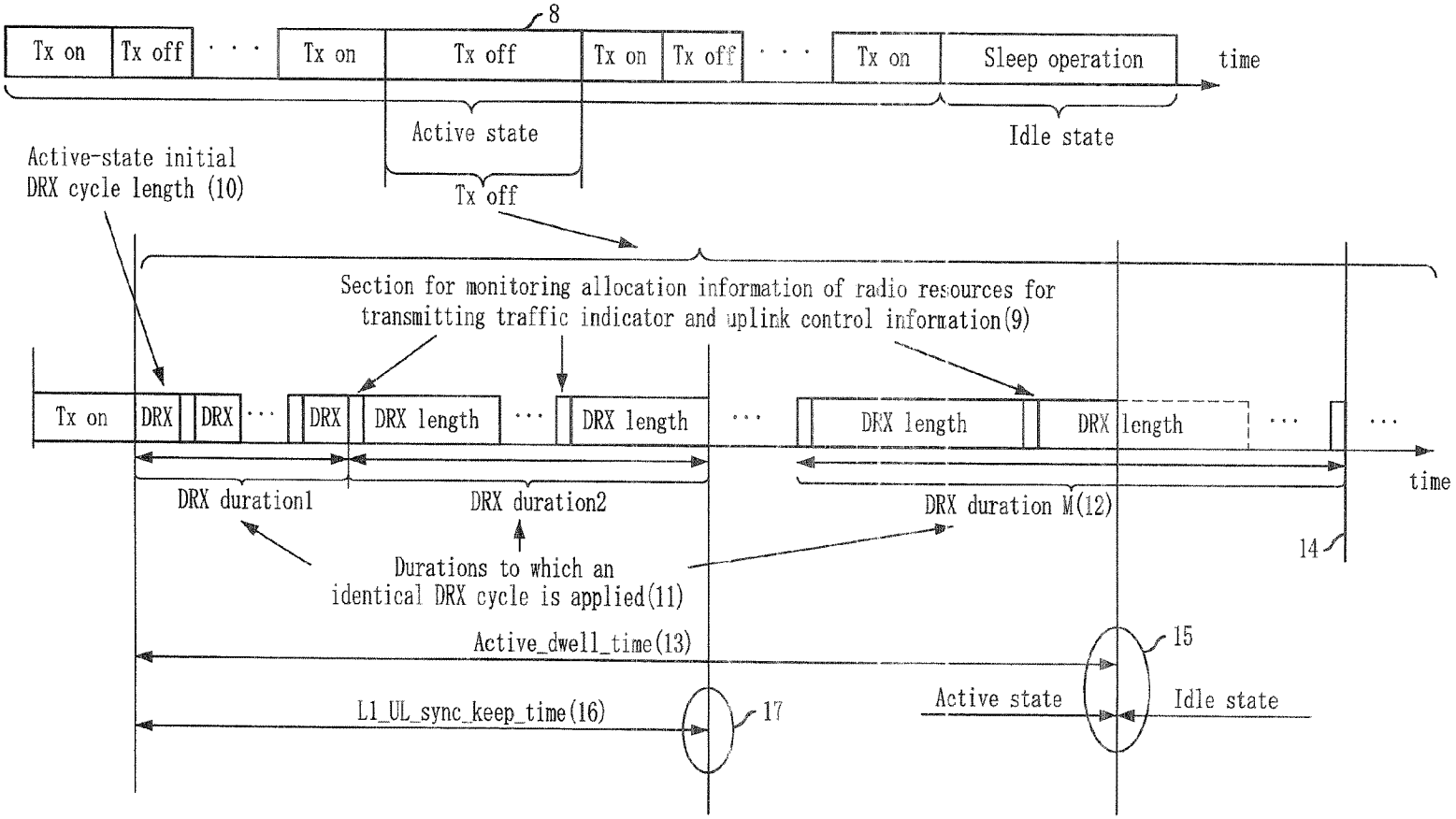
FIG. 2 is a view showing a low power-consuming operation based on low power-consuming operation parameters in accordance with an embodiment of the present invention.

FIG. 2 is a view showing a low power-consuming operation based on low power-consuming operation parameters in accordance with an embodiment of the present invention.

Referring to FIG. 2, the low power-consuming operation of a terminal is controlled based on low power-consuming operation parameters in the transmission suspension mode 8 of the active state.

The low power-consuming operation parameters include an active-state initial DRX cycle length 10, a DRX cycle augmentation coefficient, a DRX duration 11, the number of DRX durations 12, active dwelling time (Active_dwell_time) 13, low power consuming operation indicator, i.e., a power-saving indicator, and a physical layer uplink sync sustaining time (L1_UL_Sync_keep_time) 16.

The active-state initial DRX cycle length 10 is the minimum value of a DRX cycle length for a terminal in the transmission suspension mode to perform low power-consuming operation. The DRX cycle augmentation coefficient is an increased amount of the DRX cycle length that performs DRX operation. The DRX duration 11 is a section to which a DRX is applied. It is established as a counter number or time. When one DRX duration ends, another DRX cycle which is obtained by increasing the DRX cycle as much as the DRX cycle augmentation coefficient parameters in the next DRX duration.

The number of DRX durations 12 is the number of DRX durations needed for a terminal to perform the low power-consuming operation. The active dwelling time (Active_dwell_time) 13 is a threshold value of time for which a terminal can remain in the active state without having packet data to be transmitted to a transmission buffer.

The low power-consuming operation indicator, i.e., a power-saving indicator indicates whether to perform the low power-consuming operation in a terminal. When the low power-consuming operation indicator is set "on," the base station and terminal performs low power-consuming operation when the terminal enters the transmission suspension mode. When the low power-consuming operation indicator is set "off," the low power-consuming operation is not performed in the terminal.

The physical layer uplink sync sustaining time (L1_UL_Sync_keep_time) 16 is a threshold value of time for which uplink synchronization should be sustained in a physical layer while a terminal operates in the transmission suspension mode.

As aforementioned, the low power-consuming operation parameters are established through negotiation between the base station and the terminal. The active-state initial DRX cycle length parameter may differ according to the quality of service (QoS) attributes of a provided packet service.

The base station may inform the generation of downlink traffic in a monitoring section 9 at a termination moment of a DRX cycle or it may transmit radio resource allocation information for reporting or a radio resource allocation request through the uplink. A terminal operating in the transmission suspension mode recognizes the presence of downlink traffic transmitted through a downlink traffic notification channel in the monitoring section and determines whether to receive the downlink packet data or not. Otherwise, the terminal operating in the transmission suspension mode recognizes uplink radio resource allocation information transmitted through a downlink control channel and transmits control information, such as measurement information or a radio resource allocation request through the uplink.

When there is no downlink traffic or when packet data to be transmitted through the uplink is not transmitted from the upper layer of a terminal, the terminal performs the low power-consuming operation in DRX cycles until the next monitoring section. In the low power-consuming operation, the terminal does not receive downlink signals and does not transmit signals through the uplink, either.

The DRX cycle length for low power-consuming operation is determined by a base station to efficiently operate the system. When one DRX cycle ends without setting up an additional parameter, the base station may determine the next DRX cycle based on the control information transmitted in the monitoring section 9 and notify terminals of the next DRX cycle. Herein, the scheduling unit of the base station may change the DRX cycle according to the QoS attributes of the provided packet service and loads applied to the system.

Meanwhile, when the low power-consuming operation is performed based on the low power-consuming operation parameters determined through negotiation between the base station and the terminals, a DRX cycle is applied to one DRX duration. When one DRX duration ends, the base station and the terminals can negotiate and re-establish the next DRX duration.

A DRX cycle is determined in the following algorithm based on the parameters determined through the negotiation between the base station and the terminals.

When $n>0$ and $n \bmod \text{DTX/DRX duration} = 0$, $$\text{DRX cycle}(n+1) = \text{DRX cycle}(n) * \text{DRX cycle augmentation coefficient}.$$

In other cases,

DRX cycle(n+1)=DRX cycle (n)

where n=0, 1, 2, 3 . . .

DRX cycle(0)=DRX cycle initial value

DRX cycle augmentation coefficient=1, 2, 3 . . . , j

DRX duration=time duration (or a threshold value of a counter) to which the same DRX cycle is applied The terminals perform the low power-consuming operation based on the low power-consuming operation parameters determined as above.

When data to be transmitted or received are not generated until the moment 14 that the time determined based on the DRX duration and the number of DRX durations ends, the scheduling unit in the base station shifts the terminal into the idle state or re-establishes the low power-consuming operation parameters.

Meanwhile, when data to be transmitted or received are not generated until the moment 15 when an additional timer is provided and an active dwelling time (Active_dwell_time) is achieved, the scheduling unit of the base station shifts the terminal into the idle state or re-establishes the low power-consuming operation parameters.

The scheduling unit and the terminal may include a timer for a physical layer uplink sync sustaining time (L1_UL_Sync_keep_time) and, when data to be transmitted or received are not generated until the moment 17 when a physical layer uplink sync sustaining time is achieved, they operate the terminal not to sustain the physical layer sync for the uplink and reduce the power consumption of the terminal.

Figure 3:
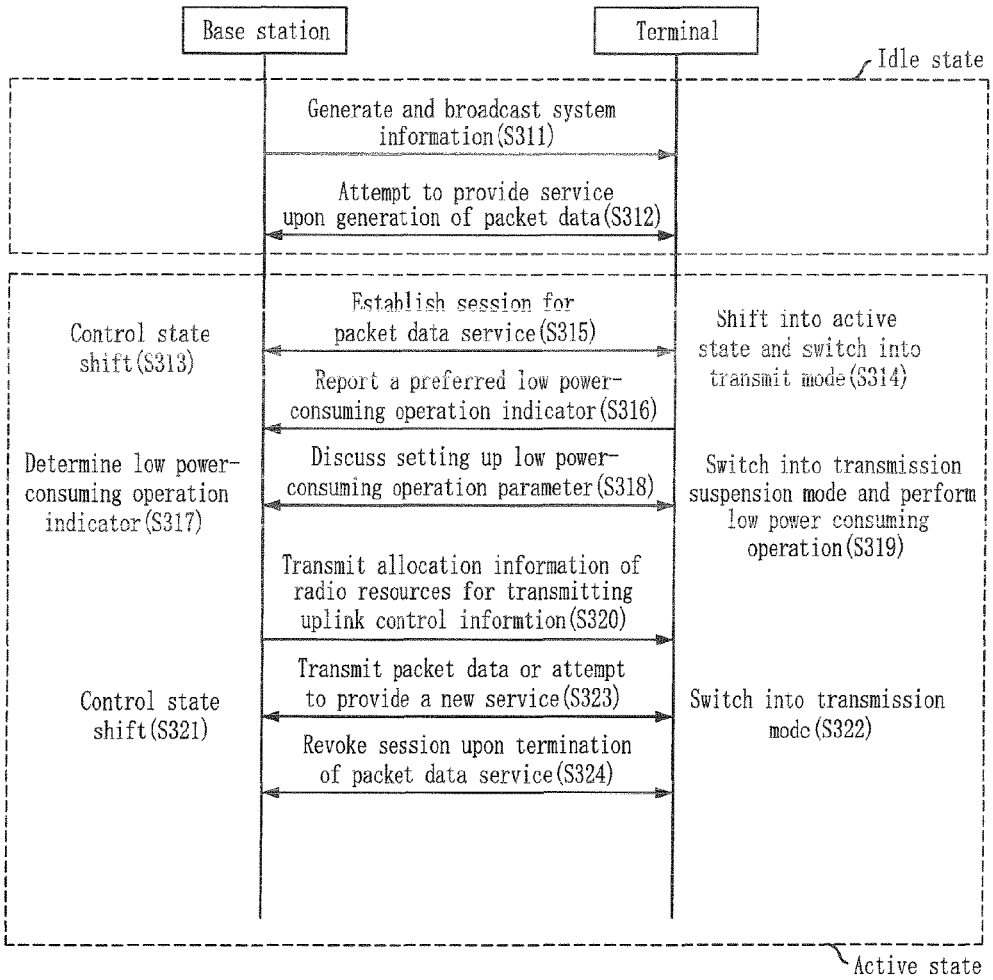
FIG. 3 is a signaling flowchart between a base station and a terminal that perform low power-consuming operation in accordance with an embodiment of the present invention.

FIG. 3 is a signaling flowchart between a base station and a terminal that perform low power-consuming operation in accordance with an embodiment of the present invention.

The base station determines low power-consuming operation parameters based on the QoS of the packet service, generates system information including the low power-consuming operation parameters, and transmits it through a broadcasting channel at step S311.

The low power-consuming operation parameters included in the system information are the active-state initial DRX cycle length 10, the DRX cycle augmentation coefficient, the DRX duration 11, the number 12 of DRX durations, and the active dwelling time (Active_dwell_time) 13.

At step S312, when packet data are generated, the base station attempts to provide a service corresponding to the packet data. Herein, the base station attempts to provide the service through paging, and the terminal receives the system information during a paging monitoring section and attempts to access in a random access method to receive the service corresponding to the generated packet data.

The base station shifts the terminal into the active state at step S313, and the terminal shifts into the active state and operates in the transmission mode at step S314. When the terminal shifts from the idle state into the active state, the base station and the terminal establish a session though negotiation.

Meanwhile, the base station and the terminal perform an Radio Resource Control (RRC) connection through the session establishment to transmit/receive packet data, and they set up basic parameters of the upper layer for it.

At step S316, the terminal reports a low power-consuming operation indicator preferred according to the power setup environment of the terminal to the base station. When the terminal is connected to an external power source or it does not need to perform the low power-consuming operation for other reasons, the terminal reports a low power-consuming operation indicator set to be 'off' to the base station to inform the base station that the terminal does not need to perform the low power-consuming operation. In the other cases, the terminal reports a low power-consuming operation set to be 'on' which informs the base station that it needs to perform the low power-consuming operation. Also, the terminal may receive a signal directly from a user and set up a needed low power-consuming operation indicator.

At step S317, when the terminal enters the transmission suspension mode in the active state, the base station determines a low power-consuming operation indicator to be applied to the terminal based on the low power-consuming operation indicator reported by the terminal and the environment of the base station.

At step S321, the terminal is shifted into the active state by controlling the state shift, and the terminal whose mode is shifted into the active state operates in the transmission mode at step S722, and the base station and terminal establishes session for the packet data service at step S723.

When the base station determines the low power-consuming operation value to be applied to the terminal to be 'on', it negotiates and sets up the low power-consuming operation parameters at step S318.

To be specific, at the step S318, the terminal negotiates the low power-consuming operation parameters, such as the physical layer uplink sync sustaining time, the active-state initial DRX cycle length, the DRX cycle augmentation coefficient, the DRX duration, the number of DRX durations, and the active dwelling time, through negotiation with the base station, or establishes the parameters based on the system information transmitted through a broadcasting channel without negotiation.

Subsequently, at step S319, the terminal enters the transmission suspension mode and performs low power-consuming operation based on the established low power-consuming operation parameters.

Through the process described above, the base station can not only apply an appropriate DRX cycle in consideration of the QoS of the provided packet service, but also divide the terminals within the service coverage into those in need of the low power-consuming operation and those that do not need the low power-consuming operation based on the low power-consuming operation indicator.

The scheduling unit of the base station can inform generation of downlink traffic to the terminals operating in the transmission suspension mode of the active state and having a low power-consuming operation indicator of 'off', whenever it needs to do, regardless of the value of the low power-consuming operation parameters, such as the DRX cycle length. The scheduling unit can also transmit a report or radio resource allocation information for requesting resources through the uplink. However, when the low power-consuming operation indicator is set up to be 'on', the scheduler sets up the low power-consuming operation parameters according to the QoS of the provided packet service, and performs low power-consuming operation.

Meanwhile when the terminal operating in the low power-consuming operation sets up and reports its low power-consuming operation indicator to be 'off', and the base station determines and changes the low power-consuming operation indicator from on into off and notifies the change to the terminal to there by control the terminal operate in the active state without performing the low power-consuming operation. In other words, the base station determines the low power-consuming operation indicator in consideration of the low power-consuming operation indicator reported by the terminal and the base station environment, and informs the terminal of the determined low power-consuming operation indicator.

Subsequently, the base station transmits information informing the generation of downlink traffic in a monitoring section 9 where a downlink signal is received, or it transmits radio resource allocation information for transmitting uplink control information to make a report or request for radio resources through the uplink at step S320.

Subsequently, when data to be transmitted are generated when the terminal is in the transmission suspension mode, the terminal changes its mode into the transmission mode upon the state shift control, which is performed in the base station at step S321, at step S322. At step S323, the terminal transmits packet data or attempts to provide a new service. When the packet data service ends, the terminal cancels a session.

The method of the present invention may be realized as a program and stored in computer-readable recording media, such as CD-ROM, RAM, ROM, floppy disks, hard disks, and magneto-optical disks. Since the present invention can be easily implemented by those of ordinary skill in the art of the present invention, detailed description on it will not be provided herein.

The method of the present invention can effectively reduce the power consumption of a terminal by controlling the terminal to perform the low power-consuming operation in the active state with an low power-consuming operation indicator, which indicates whether the terminal is in need of performing the low power-consuming operation, in a cellular system for transmitting packets.

While the present invention has been described with respect to certain preferred embodiments, it will be apparent to those skilled in the art that various changes and modifications may be made without departing from the scope of the invention as defined in the following claims.

What is claimed is:

1. A method for discontinuous reception operation of a terminal in wireless communication system, comprising of:

transmitting preferred information for low power-consuming operation to a base station;

receiving parameters for performing the discontinuous reception operation from the base station; and performing, in an active state, the discontinuous reception operation based on the received parameters, wherein messages from the base station are monitored discontinuously according to a discontinuous reception cycle, wherein uplink synchronization is sustained until a predetermined time is expired and the uplink synchronization is not sustained after the predetermined time is expired in the active state, wherein the parameters are configured by the base station based on the preferred information.

2. The method as recited in claim 1, wherein the parameters include information of the predetermined time.

3. The method as recited in claim 1, wherein the preferred information is a low power-consuming operation indicator preferred by the terminal.

4. The method as recited in claim 1, wherein the discontinuous reception operation is initiated when a discontinuous reception operation initiation message is received from the base station.

5. The method as recited in claim 1, wherein the parameters are received through a broadcasting channel from the base station.

6. A *communication* method [for supporting discontinuous reception operation of a terminal in a base station in wireless communication system] *performed by, the method* comprising[of]:

receiving [preferred], *at a base station, a first message comprising first* information [for] *on a preference of a terminal about implementing* low [power-consuming operation] *power consumption* from the terminal;

[configuring parameters for performing the discontinuous reception operation of the terminal which is capable of transmitting/receiving data to/from the base station] *determining, at the base station, a first parameter at least based on the first information*;

transmitting [the configured parameters], *at the base station, a second message comprising the first parameter* to the terminal; and

[transmitting messages to the terminal, wherein the parameters are configured to support discontinuous reception operation by the terminal in an active state, wherein the messages are discontinuously monitored according to a discontinuous reception cycle by the terminal, wherein uplink synchronization is sustained until a predetermined timer is expired and the uplink synchronization is not sustained after the predetermined timer is expired in the active state being capable of transmitting/receiving data to/from the base station, wherein the parameters are configured by the base station based on the preferred information] *performing, at the base station, a discontinuous reception (DRX) operation for the terminal based on the first parameter in an active state.*

7. The *communication* method as recited in claim 6, wherein the [parameters include information of the predetermined timer] *first parameter comprises a first DRX cycle and a first period of time, and the DRX operation is performed based on the first DRX cycle during the first period of time.*

8. The *communication* method as recited in claim [6] *7*, wherein [the preferred information is a low power-consuming operation indicator preferred by the terminal] *the first parameter further comprises a second period of time, and, after the first period of time, the DRX operation is performed based on a second DRX cycle during the second period of time, the second DRX cycle longer than the first DRX cycle.*

9. The *communication* method as recited in claim 6, [wherein the discontinuous reception] *further comprising:*

*transmitting a third message to the terminal, wherein the third message instructs the terminal to start DRX* operation[is initiated when a discontinuous reception operation initiation message is received by the terminal].

10. The *communication* method as recited in claim 6, wherein the *first* parameters are received through a broadcasting channel [from the base station] *to the terminal.*

11. A method for discontinuous reception operation of a terminal in wireless communication system, comprising of:

transmitting preferred information for low power-consuming operation to a base station;

receiving performing information of whether performing the discontinuous reception operation from the base station; and performing, in an active state, the discontinuous reception operation based on the performing information, wherein messages from the base station are monitored discontinuously according to a discontinuous reception cycle, wherein uplink synchronization is sustained until a predetermined time is expired and the uplink synchronization is not sustained after the predetermined time is expired in the active state, wherein the performing information is configured by the base station based on the preferred information.

12. The method as recited in claim 11, wherein the preferred information is a low power-consuming operation indicator preferred by the terminal.

13. A method for supporting discontinuous reception operation of a terminal in a base station in wireless communication system, comprising of:

receiving preferred information for low power-consuming operation from the terminal;

configuring performing information of whether performing the discontinuous reception operation of the terminal which is capable of transmitting/receiving data to/from the base station;

transmitting the configured performing information to the terminal; and transmitting messages to the terminal, wherein the performing information is configured to support discontinuous reception operation by the terminal in an active state, wherein the messages are discontinuously monitored according to a discontinuous reception cycle by the terminal, wherein uplink synchronization is sustained until a predetermined timer is expired and the uplink synchronization is not sustained after the predetermined timer is expired in the active state being capable of transmitting/receiving data to/from the base station, wherein the performing information is configured by the base station based on the preferred information.

14. The method as recited in claim 13, wherein the preferred information is a low power-consuming operation indicator preferred by the terminal.

*15. A communication apparatus comprising: a memory; and*

*a processor operably coupled to the memory,*

*wherein the processor, when executing program instructions stored in the memory, is configured to:*

*cause the communication apparatus to receive from a terminal a first message comprising first information on a preference of the terminal about implementing low power consumption;*

*determine a first parameter at least based on the first information;*

*cause the communication apparatus to transmit a second message comprising the first parameter to the terminal; and*

*cause the communication apparatus to perform a discontinuous reception (DRX) operation for the terminal based on the first parameter in an active state.*

*16. The communication apparatus as recited in claim 15, wherein the first parameter comprises a first DRX cycle and a first period of time, and the DRX operation is performed based on the first DRX cycle during the first period of time.*

*17. The communication apparatus as recited in claim 16, wherein the first parameter further comprises a second period of time, and, after the first period of time, the DRX operation is performed based on a second DRX cycle during the second period of time, the second DRX cycle longer than the first DRX cycle.*

*18. The communication apparatus as recited in claim 15, wherein the processor, when executing the program instructions, is configured to cause the communication apparatus to transmit a third message to the terminal, wherein the third message instructs the terminal to start the DRX operation.*

*19. The communication apparatus as recited in claim 15, wherein the first parameter is received through a broadcasting channel to the terminal.*

*20. A communication method for a discontinuous reception (DRX) operation by a terminal, the method comprising:*

*transmitting, by the terminal, a first message comprising first information on a preference of the terminal about implementing low power consumption;*

*receiving, at the terminal, a second message comprising a first parameter from the base station; and*

*performing, at the terminal, the DRX operation for the terminal based on the first parameter in an active state.*

*21. The communication method as recited in claim 20, wherein the first parameter comprises a first DRX cycle and a first period of time, and the DRX operation is performed based on the first DRX cycle during the first period of time.*

*22. The communication method as recited in claim 20, wherein the first parameter is determined based on the first information.*

*23. The communication method as recited in claim 20, further comprising:*

*receiving a third message from the base station, wherein the DRX operation is performed in response to the third message.*

*24. The communication method as recited in claim 20, wherein the first parameter is received through a broadcasting channel from the base station.*

*25. The communication method as recited in claim 21, wherein the first parameter further comprises a second period of time, and, after the first period of time, the DRX operation is performed based on a second DRX cycle during the second period of time, the second DRX cycle longer than the first DRX cycle.*

*26. A communication apparatus, comprising:*

*a memory; and*

*a processor operably coupled to the memory,*

*wherein the processor, when executing program instructions stored in the memory, is configured to:*

*cause the communication apparatus to transmit, to a base station, a first message comprising first information on a preference of the communication apparatus about implementing low power consumption;*

*cause the communication apparatus to receive, from the base station, a second message comprising a first parameter; and*

*cause the communication apparatus to perform a discontinuous reception (DRX) operation based on the first parameter in an active state.*

*27. The communication apparatus as recited in claim 26, wherein the first parameter comprises a first DRX cycle and a first period of time, and the DRX operation is performed based on the first DRX cycle during the first period of time.*

*28. The communication apparatus as recited in claim 26, wherein the first parameter is determined based on the first information.*

*29. The communication apparatus as recited in claim 26, wherein the processor, when executing the program instructions, causes the communication apparatus to receive a third message from the base station, and the DRX operation is performed in response to the third message.*

*30. The communication apparatus as recited in claim 26, wherein the first parameter is received through a broadcasting channel from the base station.*

*31. The communication apparatus as recited in claim 27, wherein the first parameter further comprises a second*

*period of time, and, after the first period of time, the DRX operation is performed based on a second DRX cycle during the second period of time, the second DRX cycle longer than the first DRX cycle.*

*32. A communication device in a terminal, the communication device comprising:*

*a processor; and*

*a memory operably coupled with the processor,*

*wherein the processor, when executing program instructions stored in the memory, is configured to:*

*cause the terminal to transmit, to a base station, a first message comprising first information on a preference of the terminal about implementing low power consumption;*

*cause the terminal to receive, from the base station, a second message comprising a first parameter; and*

*cause the terminal to perform a discontinuous reception (DRX) operation based on the first parameters in an active state.*

*33. The communication device as recited in claim 32, wherein the first parameter comprises a first DRX cycle and a first period of time, and the DRX operation is performed based on the first DRX cycle during the first period of time.*

*34. The communication device as recited in claim 32, wherein the first parameter is determined based on the first information.*

*35. The communication device as recited in claim 32, wherein the processor, when executing the program instructions, is configured to cause the terminal to receive a third message from the base station, and the DRX operation is performed in response to the third message.*

*36. The communication device as recited in claim 32, wherein the first parameter is received through a broadcasting channel from the base station.*

*37. The communication device as recited in claim 33, wherein the first parameter further comprises a second period of time, and, after the first period of time, the DRX operation is performed based on a second DRX cycle during the second period of time, the second DRX cycle longer than the first DRX cycle.*

* * * * *